(12) United States Patent
Nishimoto (10) Patent No.: US 6,600,411 B2
(45) Date of Patent: Jul. 29, 2003

(54) BICYCLE ELECTRICAL CONNECTOR CORD

(75) Inventor: Naohiro Nishimoto, Hashimoto (JP)

(73) Assignee: Shimano Inc., Osaka (JP)

( * ) Notice: Subject to any disclaimer, the term of this patent is extended or adjusted under 35 U.S.C. 154(b) by 333 days.

(21) Appl. No.: 09/801,835

(22) Filed: Mar. 9, 2001

(65) Prior Publication Data

US 2002/0127907 A1 Sep. 12, 2002

(51) Int. Cl.[7] .................................................. B62J 3/00
(52) U.S. Cl. ........................................ 340/432; 340/427
(58) Field of Search ................................ 340/432, 439, 340/441, 456, 427; 74/473.13, 473.28, 488, 502.2; 280/259, 260, 261; 324/160, 165, 166

(56) References Cited

U.S. PATENT DOCUMENTS

| | | | | |
|---|---|---|---|---|
| 4,835,468 A | * | 5/1989 | Dumbser et al. | 340/432 |
| 6,012,353 A | * | 1/2000 | Kawakami | 74/505.2 |
| 6,129,580 A | * | 10/2000 | Kishimoto | 439/496 |
| 6,367,833 B1 | * | 4/2002 | Horiuchi | 280/260 |
| 6,442,505 B1 | * | 8/2002 | Lee | 324/166 |

* cited by examiner

Primary Examiner—Van Trieu
(74) Attorney, Agent, or Firm—Shinjyu Global IP Counselors, LLP (57) ABSTRACT

A bicycle electrical connector cord includes a first connector, a primary cable, a second connector, a secondary cable and an electrical device. The first connector has a plurality of first electrical contacts. The primary cable includes a first conducting member electrically coupled to one of the first contacts and a second conducting member electrically coupled to one of the first contacts. The second connector has at least one second electrical contact electrically coupled to the first conducting member. The secondary cable extends from the second connector and includes a third conducting member electrically coupled to the second conducting member. The electrical device is electrically coupled to the third conducting member. A method is also provided for attaching a bicycle electrical connector cord to a display unit and a pair of electrical devices on a non-forward facing portion of a bicycle.

19 Claims, 10 Drawing Sheets

BICYCLE ELECTRICAL CONNECTOR CORD

BACKGROUND OF THE INVENTION

1. Field of the Invention

This invention generally relates to an electrical connector cord. More specifically, the present invention relates to a simplified bicycle electrical connector cord, which connects three electrical bicycle devices in an unobtrusive manner.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. Specifically, manufacturers of bicycle components have been continually improving performance, reliability and appearance of the various components.

Recently, bicycles have been provided with electronically controlled components. These electronic components include a rear multi-stage sprocket assembly with a motorized rear derailleur and a front multi-stage sprocket assembly with a motorized front derailleur. Additionally, many bicycles include suspension assemblies for off-road type riding. These suspension assemblies can also be electronically controlled. Many bicycles utilize a cycle computer with one or more sensors to monitor various operations of the bicycle, such as speed, cadence, riding time and gear position.

The cycle computer is also often coupled to other components that are electrically controlled or operated, such as the front derailleur, rear derailleur or suspension assemblies. In this type of an arrangement, electrical wires or cords are utilized to transmit the electrical current to and from the various components and sensors. These electrical wires or cords are often connected to the components and/or sensors by electrical connectors. These electrical wires and connectors are often attached to the bicycle frame without regard to the appearance of the bicycle.

Since the bicycle is typically utilized outdoors, the electrical connections of the electrical connectors are exposed to a variety of weather conditions. The electrical connections can often be contaminated so as to degrade performance of the operation of the electrically control component. If the electrical connections get too dirty, the bicycle components and/or sensors may not operate properly. Since the electrical connections are exposed to adverse weather conditions, it is important that the electrical connectors provide a good solid connection so that they can operate even though they may become slightly contaminated.

Additionally, in certain riding conditions such as off-road type riding, the cyclist often encounters obstructions such as bushes or tree limbs. Sometimes, these obstructions can catch the electrical wires or cords and affect performance of the electrical components and/or sensors. Additionally, in some situations, other obstructions such as clothing, bicycle lock cables or tools can catch on the electrical wires or cords. Furthermore, since these wires or cords and connectors are often attached to the bicycle without regard to their appearance, the bicycle can have an unattractive look.

In view of the above, there exists a need for an electrical connector cord which overcomes the above mentioned problems in the prior art. This invention addresses this need in the prior art as well as other needs, which will become apparent to those skilled in the art from this disclosure.

SUMMARY OF THE INVENTION

One object of the present invention is to provide an electrical connector cord with a simplified structure.

Another object of the present invention is to provide an electrical connector cord that provides improved durability and waterproofing.

Another object of the present invention is to provide an electrical connector cord, which is relatively simple and inexpensive to manufacture and assemble.

Still another object of the present invention is to provide an electrical connector cord, which contributes to a clean, attractive appearance for the bicycle.

The foregoing objects can basically be attained by providing bicycle electrical connector cord comprising a first electrical connector, a primary cable, a second electrical connector, a secondary cable and an electrical device. The first electrical connector has a first connector body with a plurality of first electrical contacts. The primary cable includes a first electrical conducting member electrically coupled to one of the first electrical contacts and a second electrical conducting member electrically coupled to one of the first electrical contacts. The second electrical connector has a second connector body with at least one second electrical contact electrically coupled to the first electrical conducting member. The secondary cable extends from the second electrical connector and includes a third electrical conducting member electrically coupled to the second electrical conducting member. The electrical device is electrically coupled to the third electrical conducting member.

The foregoing objects can also basically be attained by providing a method of attaching a bicycle electrical connector cord to a bicycle. The method includes attaching a first electrical connector to a bicycle display unit on the bicycle with a first end of primary cable extending from the first electrical connector. The method also includes attaching a second electrical connector to a first electrical device on a non-forwardly facing portion of the bicycle with a second end of the primary cable extending from the second electrical connector. The method further includes attaching a secondary cable to a non-forwardly facing portion of the bicycle with a first end of the secondary cable being coupled to the second electrical connector. The method still further includes attaching a second electrical device to a non-forwardly facing portion of the bicycle with a second end of the secondary cable being electrically coupled to the electrical device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
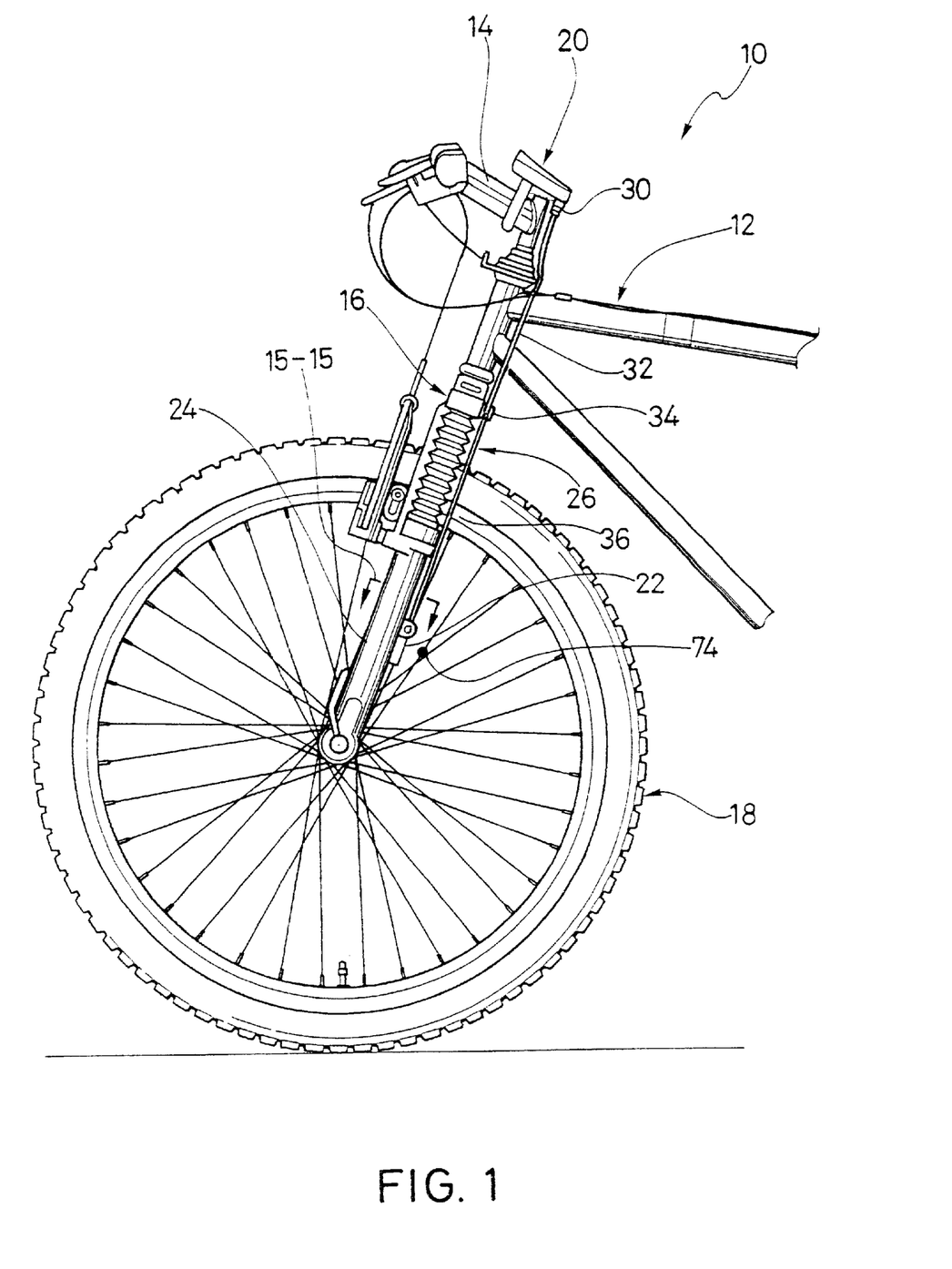
FIG. 1 is a partial, side elevational view of a bicycle with a bicycle computer, an electronically controlled front suspension and a front wheel sensor that utilize a bicycle electrical connector cord in accordance with a preferred embodiment of the present invention.
Figure 2:
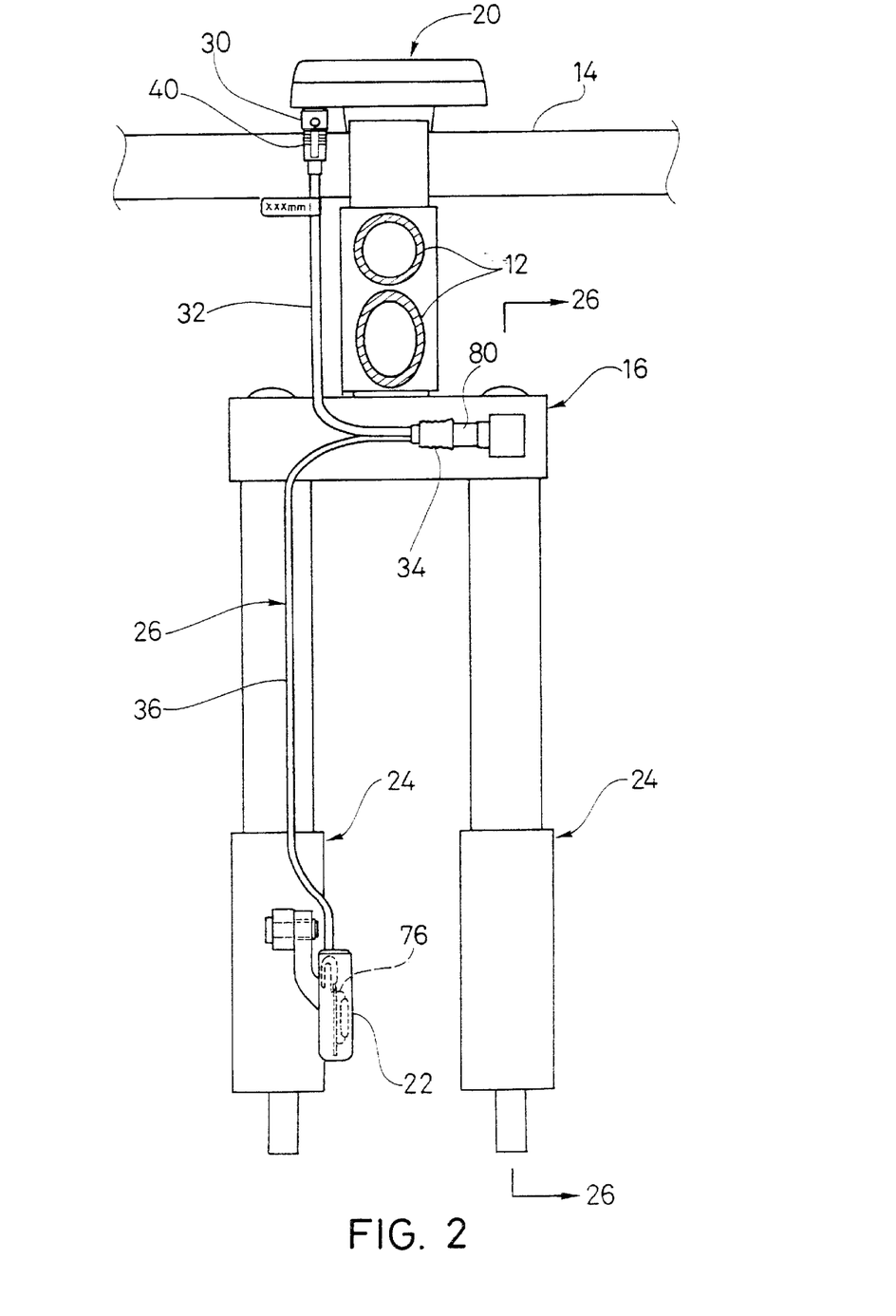
FIG. 2 is an enlarged, rear elevational of the portion of the bicycle illustrated in FIG. 1, with portions of the bicycle frame cut off to show the connection of the bicycle electrical connector cord to the bicycle computer, front wheel sensor and the front suspension fork.

Referring initially to FIGS. 1 and 2, a front portion of a bicycle 10 is illustrated with a frame 12, a handlebar 14, a front suspension fork 16 coupled to handlebar 14 and a front wheel 18 coupled to front suspension fork 16. Bicycle 10 also includes a cycle computer 20, an electrical device (front wheel sensor) 22, a pair of electronically controlled suspension units 24 (of front suspension fork 16) and an electrical connector cord 26 in accordance with a preferred embodiment of the present invention. The electrical device (sensor) 22 and the electrical connector cord 26 are coupled to non-forward facing portions of the front suspension fork 16 and cycle computer 20 in a simplified unobtrusive manner.

Bicycle 10 and its various components are well known in the prior art, except for the connection between the cycle computer 20, the electronically operated suspension units 24 (first electrical device) and the sensor 22 (second electrical device) via electrical connector cord 26. Thus, bicycle 10 and its various components will not be discussed or illustrated in detail herein, except for the components that relate to the present invention. Moreover, various conventional bicycle parts such as brakes, or drive trains, etc., which are not illustrated and/or discussed in detail herein, can be used in conjunction with the present invention. Furthermore, it will be apparent to those skilled in the art that bicycle electrical connector cord 26 could be utilized to connect various other electrical devices (i.e. other than the sensor 22, electronically controlled front suspension fork 16 and cycle computer 20) in a simplified manner as needed and/or desired.

As used herein, the following directional terms "forward, rearward, above, downward, vertical, horizontal, below and transverse" as well as any other similar directional terms refer to those directions of a bicycle in its normal riding position. Accordingly, these terms, as utilized to describe the present invention should be interpreted relative to bicycle 10 in its normal riding position.

The cycle computer 20 preferably includes a microcomputer formed on a printed circuit board that is powered by a battery unit. The microcomputer of the cycle computer 20 includes a central processing unit (CPU), a random access memory component (RAM), a read only memory component (ROM), and an I/O interface. The various components of the microcomputer are well known in the bicycle field. Therefore, the components used in the microcomputer of the cycle computer 20 will not be discussed or illustrated in detail herein. Moreover, it will be apparent to those skilled in the art from this disclosure that the cycle computer 20 can include various electronic components, circuitry and mechanical components to carryout the present invention. Of course, it will be apparent to those skilled in the art from this disclosure that the cycle computer 20 can have a variety of configurations, as needed and/or desired.

Preferably, the cycle computer 20 provides or displays various information to the rider via a display and operates the electronically controlled suspension units 24 based on input from the rider and/or input from the sensor 22. Thus, the front suspension fork 16 of bicycle 10 is operated or electronically controlled by the cycle computer 20. More specifically, the cycle computer 20 electrically operates a pair of motorized hydraulic dampers of suspension units 24 either automatically or manually as explained below in more detail. Of course, it will be apparent to those skilled in the art the bicycle electrical connector cord 26 could be used for other applications where a simplified electrical connection is needed without departing form the scope of the present invention. For example, bicycle electrical connector cord 26 could be used with any bicycle sensor and/or electronically controlled bicycle component as needed and/or desired.

Figure 3:
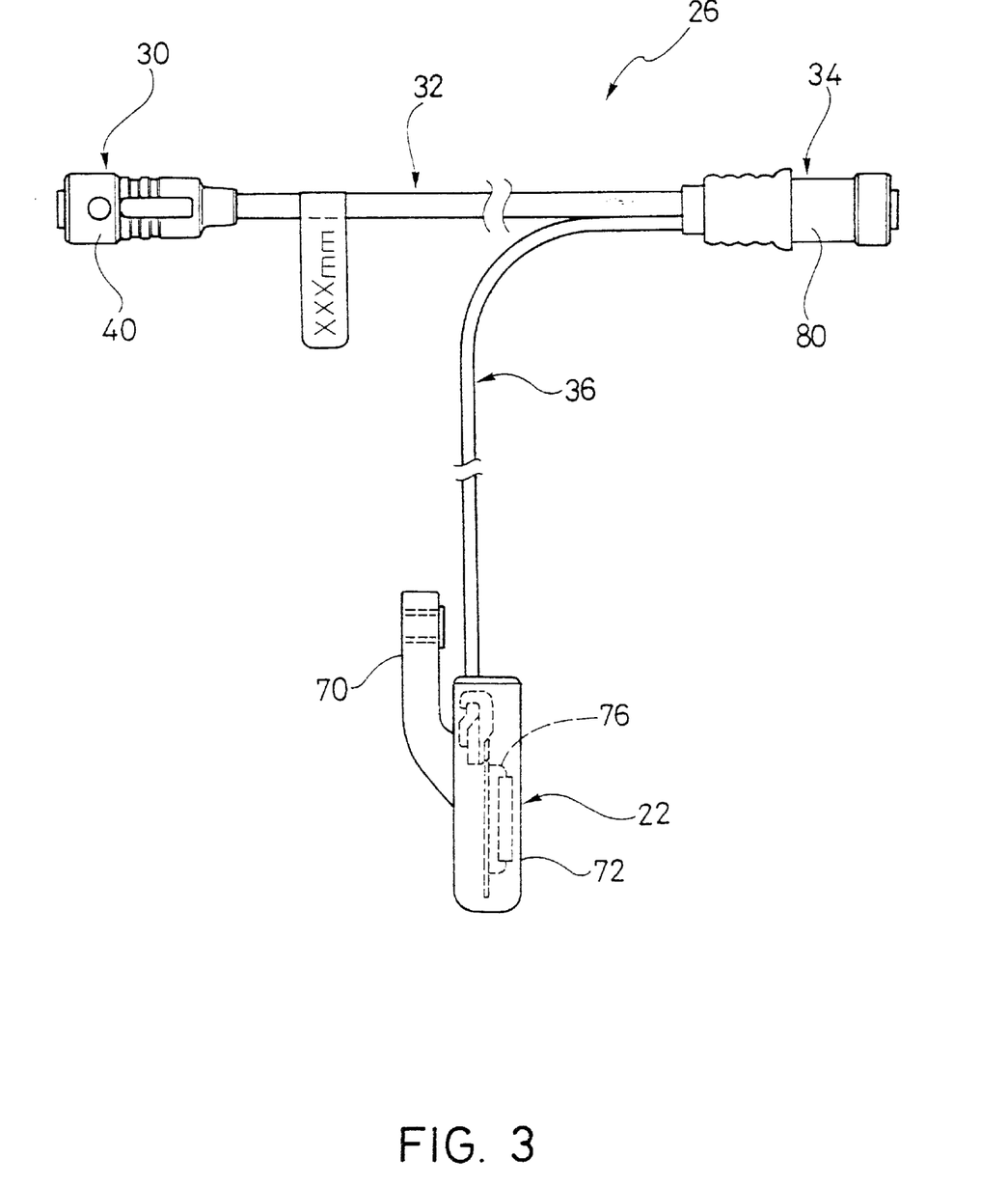
FIG. 3 is an enlarged elevational view of the bicycle electrical connector cord illustrated in FIGS. 1 and 2, showing first and second electrical connectors and primary and secondary cables.
Figure 4:
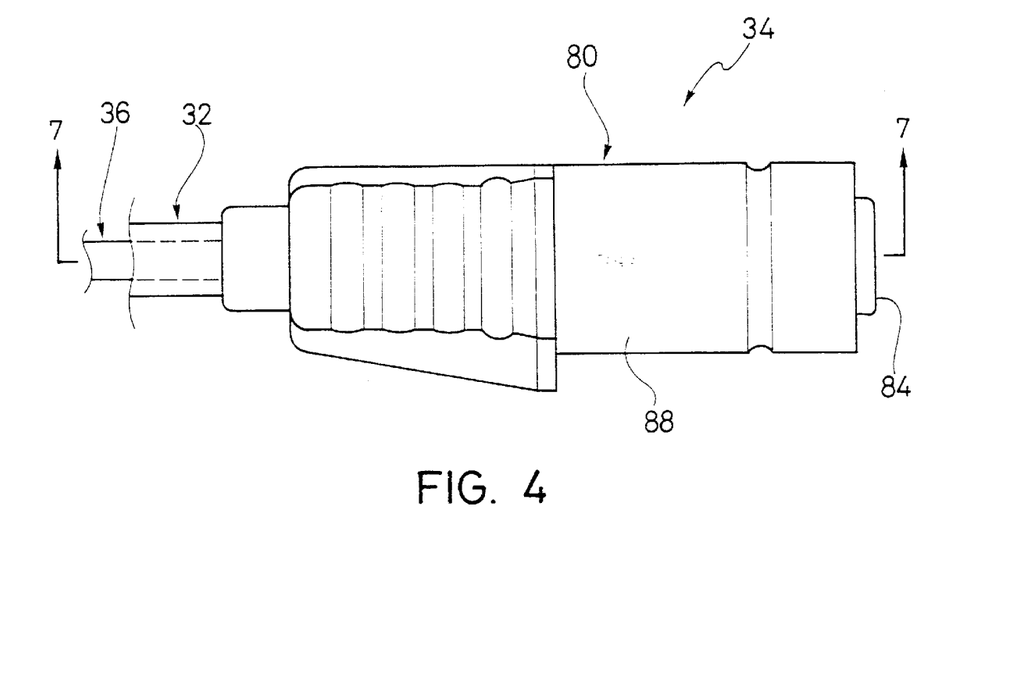
FIG. 4 is an enlarged, side elevational view of the second electrical connector (for the front fork) of the bicycle electrical connector cord illustrated in FIGS. 1–3.

Referring to FIGS. 2 and 3, bicycle electrical connector cord 26 basically includes a first electrical connector 30, a primary cable 32, a second electrical connector 34 and a secondary cable 36. Primary cable 32 electrically couples first electrical connector 30 to second electrical connector 34. Second electrical connector 34 electrically couples secondary cable 36 to part of primary cable 32. Secondary cable 36 electrically couples second electrical connector 34 to sensor 22. Thus, sensor 22 is electrically coupled to cycle computer 20 via secondary cable 36, second electrical connector 34, part of primary cable 32 and first electrical connector 30. Electronically controlled suspension units 24 are electrically coupled to cycle computer 20 via second electrical connector 34, part of primary cable 32 and first electrical connector 30. Thus cycle computer 20 can send and/or receive electronic signals and/or electric current to/from sensor 22 and suspension units 24.

First electrical connector 30 basically includes a first connector body 40 with a plurality of first electrical contacts, as seen in FIGS. 2, 3, 24 and 25. More specifically, first electrical connector 30 is a six-pin type female electrical connector and preferably includes four terminal pins 42. Each of the first electrical contacts is preferably formed of a pair of the terminal pins 42. Of course, it will be apparent to those skilled in the art that the first electrical contacts could utilize more or fewer terminal pins 42 as needed and/or desired. Moreover, it will be apparent to those skilled in the art that first electrical connector 30 could utilize more or fewer first electrical contacts as needed and/or desired. In the illustrated embodiment, first electrical connector 30 is designed to mate with a male electrical connector of cycle computer 20. First electrical connector 30 is similar to second electrical connector 34 and will be discussed in more detail below.

The male electrical connector of cycle computer 20 is relatively conventional, and therefore, will not be discussed and/or illustrated in detail herein. Basically, the male electrical connector of cycle computer 20 has a receptor housing with six (or fewer) receptor pins. The receptor pins have a circular cross-section and are arranged in a pattern to mate with first electrical connector 30. The receptor housing preferably has an annular flange for releasably retaining the electrical connector 30 thereto via a snap-fit. The receptor housing is constructed of a non-conductive material such as a hard, rigid plastic material. The receptor pins are constructed of a conductive material.

Figure 5:
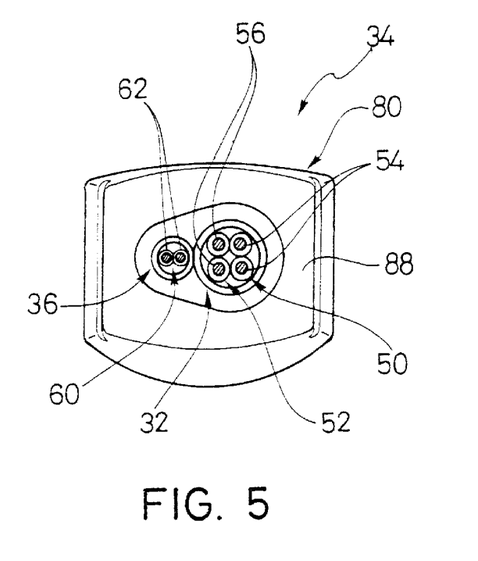
FIG. 5 is an end elevational view of the second electrical connector illustrated in FIG. 4, with the primary cable and the secondary cable shown in cross-section for purposes of illustration.
Figure 6:
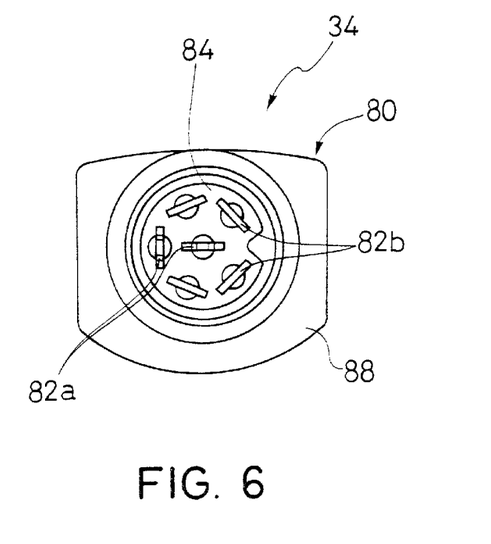
FIG. 6 is an opposite end elevational view of the second electrical connector illustrated in FIGS. 4 and 5.
Figure 8:
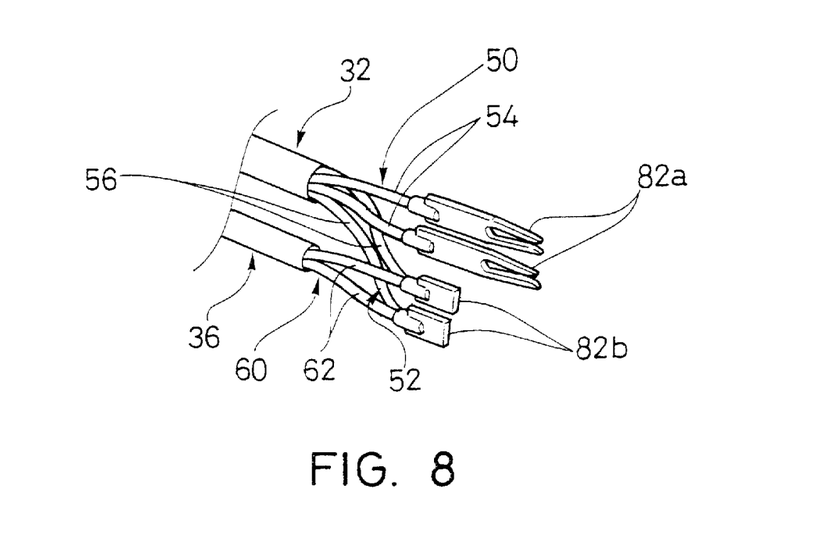
FIG. 8 is a partial, perspective view the primary and secondary cables of the bicycle electrical connector cord illustrated in FIGS. 1–3, showing individual conductors connected to various terminal pins of the electrical connector illustrated in FIGS. 4–7.
Figure 9:
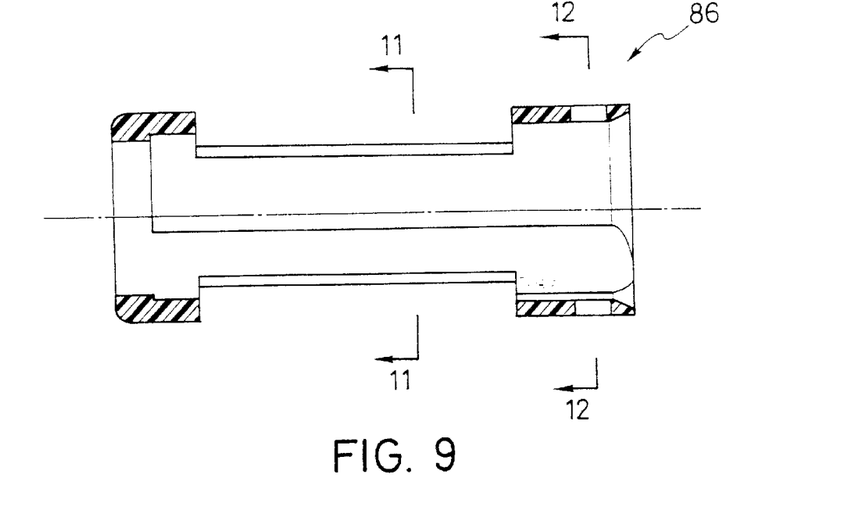
FIG. 9 is a longitudinal cross-sectional view of the inner casing of the second electrical connector illustrated in FIGS. 4–7.
Figure 10:
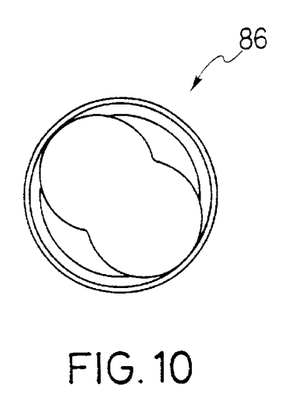
FIG. 10 is a right end elevational view of the inner casing illustrated in FIG. 9.
Figure 11:
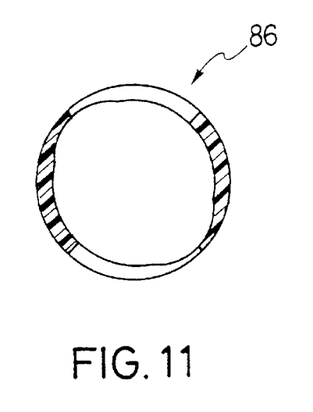
FIG. 11 is a transverse cross-sectional view of the inner casing illustrated in FIGS. 7, 9 and 10 as seen along section 11—11 of FIG. 9.
Figure 12:
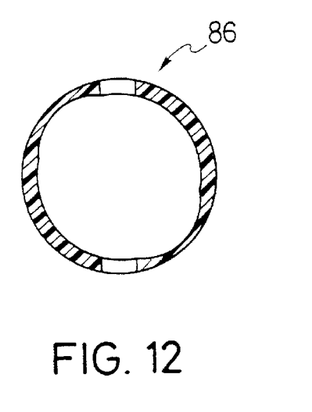
FIG. 12 is a transverse cross-sectional view of the inner casing illustrated in FIGS. 7, 9 and 10 as seen along section 12—12 of FIG. 9.
Figure 13:
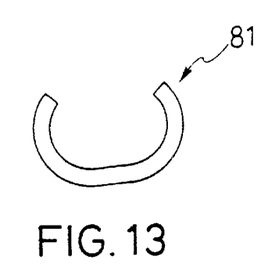
FIG. 13 is a side elevational of the retaining ring of the second electrical connector illustrated in FIGS. 4–7.
Figure 14:
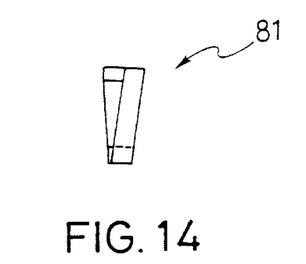
FIG. 14 is an end elevational view of the retaining ring illustrated in FIG. 13.
Figure 25:
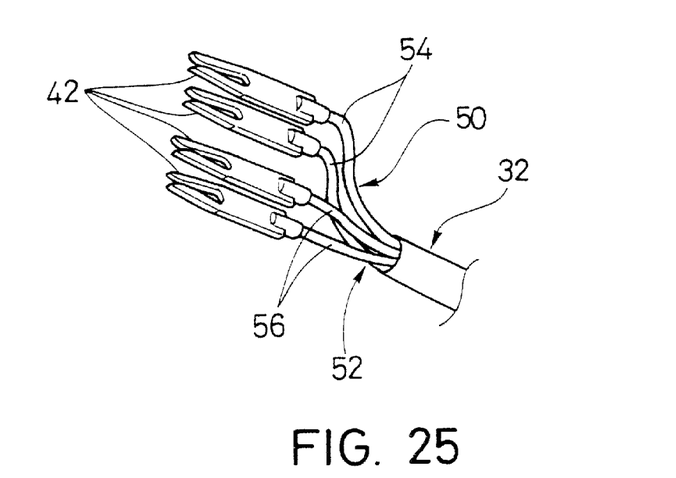
FIG. 25 is a partial, perspective view the primary cable of the bicycle electrical connector cord illustrated in FIGS. 1–3, showing individual conductors connected to various terminal pins of the electrical connector illustrated in FIG. 24.

Primary cable 32 basically includes a pair (first and second) of electrical conducting members 50 and 52, as best seen in FIGS. 5, 8 and 25. An outer non-conductive sheath surrounds electrical conducting members 50 and 52. Insulation or filler can be utilized within the outer sheath as needed or desired. Each electrical conducting member 50 and 52 preferably includes a pair of individual (first and second) conductors 54 and 56, respectively. Each individual conductor 54 or 56 includes a conductive core and an insulating sheath. Each of the individual conductors 54 and 56 is electrically coupled to one of the terminal pins 42 of first electrical connector 30. In other words, each of electrical conducting members 50 and 52 are coupled to one of the first electrical contacts (i.e. a pair of terminal pins 42). Of course, primary cable 32 could have an additional conducting member formed of an additional pair of individual conductors if needed and/or desired since first electrical connector 30 is a six-pint type electrical connector. Opposite ends of first and second electrical conducting members 50 and 52 (individual conductors 54 and 56) are electrically coupled to second electrical connector 34, as discussed below in more detail.

Secondary cable 36 preferably includes a third electrical conducting member 60 electrically coupled to second electrical conducting member 52 of primary cable 32, as best seen in FIG. 8. An outer non-conductive sheath surrounds electrical conducting member 60. Insulation or filler can be utilized within the outer sheath as needed or desired. Third electrical conducting member 60 is preferably formed of a pair of individual third conductors 62 electrically coupled to second conductors 56 of second electrical conducting member 52. Each individual conductor 62 includes a conductive core and an insulating sheath. Third electrical conductors 62 are preferably coupled to second electrical conductors 56 at second electrical connector 34, as discussed below in more detail. Opposite ends of third electrical conductors 62 are electrically coupled to sensor 22 at first electrical conductor 30. Thus, sensor 22 is electrically coupled to computer 20 via first electrical connector 30, primary cable 32, second electrical connector 34 and secondary cable 36.

Referring to FIGS. 4–14, second electrical connector 34 is a six-pin type female electrical connector, and basically includes a second connector body 80 with at least one second electrical contact electrically coupled to first electrical conducting member 50. Second electrical connector 34 also preferably includes at least one third electrical contact electrically coupled to second electrical conducting member 52 and third electrical conducting member 60 within second connector body 34. Preferably, a pair of terminal pins 82a form the second electrical contact and are electrically coupled to individual first conductors 54 of first electrical conducting member 50 by soldering in a conventional manner. Preferably, a pair of short terminal pins 82b form the third electrical contact and are electrically coupled to individual second and third conductors 56 and 62 by soldering in a conventional manner. In the illustrated embodiment, second electrical connector 34 is designed to mate with a male electrical connector of front suspension fork 16.

Basically, the male electrical connector of front suspension fork 16 is relatively conventional, and therefore, will not be discussed and/or illustrated in detail herein. Basically, the male electrical connector of front suspension fork 16 has a receptor housing with six (or fewer) receptor pins. The receptor pins have a circular cross-section and are arranged in a pattern to mate with second electrical connector 34. The receptor housing preferably has an annular flange for releasably retaining the electrical connector 34 thereto via a snap-fit. The receptor housing is constructed of a non-conductive material such as a hard, rigid plastic material. The receptor pins are constructed of a conductive material. In other words, the male connector of the front suspension fork 16 is substantially identical to the male connector of the cycle computer 20.

Preferably, second electrical connector 34 includes one pair of terminal pins 82a and one pair of short terminal pins 82b as seen in FIG. 8. Short terminal pins 82b are electrically coupled to second electrical conducting member 52 of primary cable 32 and third electrical conducting member 60 of secondary cable 36, as mentioned above. Specifically, individual second conductors 56 and individual third conductors 62 of second and third conducting members 52 and 60, respectively, are electrically coupled to short terminal pins 82b by soldering in a conventional manner, as also mentioned above. Short terminal pins 82b are modified versions of terminal pins 82a, as discussed in more detail below. More specifically, short terminal pins 82b are cut off such that short terminal pins 82b will not make electrical contact with receptor pins of the male connector.

Figure 7:
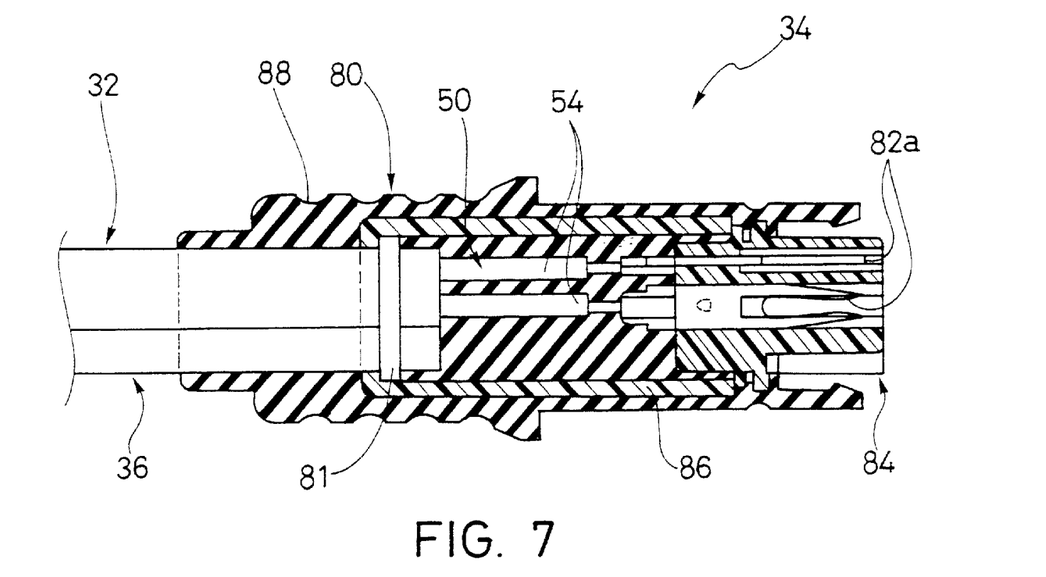
FIG. 7 is a longitudinal cross-sectional view of the second electrical connector illustrated in FIGS. 4–6 as seen along section 7—7 of FIG. 4, with the primary and secondary cables shown in elevation for the purpose of illustration.

Second connector body 80 is basically formed of a terminal housing 84, an inner casing 86 and an outer casing 88, as seen in FIG. 7. In the illustrated embodiment, second electrical connector 34 is a female electrical connector or receptacle with six terminal pin receptacles. Of course, it will be apparent skilled in the art from this disclosure that second electrical connector 34 can be a male electrical connector or a plug without departing from certain aspects of the present invention. Also, in the illustrated embodiment, second electrical connector 34 includes two terminal pins 82a and two short terminal pins 82b. Of course, it will be apparent to those skilled in the art from this disclosure that the number and/or type of terminal pins can be fewer or more depending upon the particular application or use of electrical connector 34. However, in the illustrated embodiment, only the two terminal pins 82a are electrically coupled to the front suspension fork 16, as discussed below in more detail.

Terminal housing 84 is preferably formed of non-conductive material and includes the plurality of terminal pin receptacles formed therein. Terminal housing 84 has a generally cylindrical shape with a pair of protrusions or detents formed adjacent the second end and a pair of annular flanges that form an annular recess therebetween. The protrusions or detents and one of the flanges form part of a snap-fit that couples the terminal housing 84 to the inner casing 86. The detents are preferably diametrically opposed, i.e., spaced 180° apart along the outer surface of the terminal housing 84. The other annular flange and the annular recess are designed to ensure that outer casing 88 is securely molded onto terminal housing 84, as explained below in more detail.

Terminal pins 82a and 82b are received in the terminal pin receptacles. Terminal housing 84 is preferably constructed of a hard, rigid plastic material for housing the terminal pins 82. Preferably terminal housing 84 is molded as a one-piece, unitary member constructed of a substantial hard, rigid non-metallic material such as nylon. The terminal pins 82a and 82b are preferably frictionally retained or press-fitted within each one of the terminal pin receptacles of the terminal housing 84. Terminal housing 84 is relatively conventional, and thus, will not be discussed and/or illustrated in detail herein.

The terminal pins 82a and 42 are identical and preferably constructed of any conductive material that is normally utilized in the electrical connector art. Preferably, each of the terminal pins 82a and 42 is formed from a stamped sheet metal material and has a first contact end, a second connection end with a bent portion, and a cord receiving recess formed by the bent portion. The cord receiving recess is designed to receive a portion of the end of one of the electrical conductors 54 of the primary cable 32. Preferably, the electrical conductors 54 are soldered within the cord receiving recess to form a secure connection therebetween. The bent portion also forms a stop on a second longitudinal side of the connection end portion. Terminal pins 82a and 42 are also relatively conventional, and thus, will not be discussed or illustrated in detail herein.

Short terminal pins 82b are modified versions of terminal pins 82a, as mentioned above. Specifically, short terminal pins 82b are identical to terminal pins 82a and 42, except short terminal pins 82b are cut off. More specifically, each of the short terminal pins 82b is formed from a stamped sheet metal material and has a first cut off end, a second connection end with a bent portion, and a cord receiving recess formed by the bent portion. Each cord receiving recess is designed to receive a portion of the end of one of the electrical conductors 56 of the primary cable 32 and a portion of the end of one of the electrical conductors 62 of the secondary cable 36. Preferably, the electrical conductors 56 and 62 are soldered within the cord receiving recess to form a secure connection therebetween. The bent portion also forms a stop on a second longitudinal side of the connection end portion.

Referring now to FIGS. 7 and 9–12, inner casing 86 has a tubular side wall with the terminal housing 84 located in a first open end of the tubular side wall. The electrical conductors 50, 52, and 60 (i.e. ends of primary and secondary cables 32 and 36) are located in a second open end of the tubular side wall. More specifically, a C-shaped retaining member 81 (FIGS. 7, 13 and 14) holds primary cable 32 and secondary cable 36 together.

The tubular side wall preferably has at least one side opening, and preferably two side openings that are diametrically opposed 180 degrees apart. These side openings are relatively large to allow the material of the outer casing 88 to freely flow into the interior of the inner casing 86. Thus, the ends of the electrical conductors 50, 52 and 60 are completely covered by the material of outer casing 88. This ensures a good waterproof connection there between. Moreover, by completely encasing the electrical connections between the electrical conductors 50, 52 and 60, and the terminal pins 82, the electrical connections are very durable and resistant to detachment.

The tubular side wall is also preferably provided with a pair of notches, which are formed as rectangular openings. These notches form a part of a snap-fit arrangement between the terminal housing 84 and the inner casing 86. In other words, the notches are diametrically opposed from each other, i.e., spaced 180° apart around the inner casing 86. The inner casing 86 is constructed from a relatively rigid material with a limited amount of resiliency. In other words, due to the tubular shape of the inner casing 86, the tubular side wall can flex radially outwardly upon the insertion of the terminal housing 84 being inserted into the first open end of the inner casing 86. Insertion of the terminal housing 84 into the first open end 94 causes the protrusions or detents of the terminal housing 84 to engage the inner surface of the tubular side wall of the inner casing 86. The protrusion causes the tubular side wall to flex slightly outwardly until the protrusions of terminal housing 84 engage the notches of inner casing 86.

Preferably, the protrusions (one shown in broken lines in FIG. 7) are substantially ramp-shaped members with abutment surfaces facing in a longitudinal direction towards the first end of the terminal housing 84. The notches have mating abutment surfaces that face in an axial direction towards the second open end of the inner casing 86. Thus, relative axial movement of the terminal housing 84 away from the inner casing 86 is prevented. Moreover, the annular flange of the terminal housing 84 abuts the first open end of the inner casing 86 to prevent further inward axial movement of the terminal housing 84 relative to the inner casing 86.

Referring still to FIGS. 7 and 9–12, the outer casing 88 is molded over end portions of primary cable 32 and secondary cable 36. Outer casing 88 also extends into the side openings of the tubular side wall of the inner casing 86. The outer casing 88 is also formed of a non-conductive material such as a plastic or elastomeric material. During the molding process, the material of the outer casing 88 is molded over the entire inner casing 86, as well as portions of the primary cable 32, secondary cable 36 and the terminal housing 84. Accordingly, the interface between the terminal housing 84 and the first open end of the inner casing 86 is sealed to prevent contaminants from entering therebetween. Moreover, the material of the outer casing covers both annular flanges and extends into the annular recess of terminal housing 84 to ensure a watertight seal.

The side openings of inner casing 86 are designed to allow the material of the outer casing 88 to freely flow into the interior of the inner casing 86 so as to completely cover the ends of the electrical conductors 54, 56 and 62, and the connection ends of the terminal pins 82a and 82b. This ensures a good waterproof connection therebetween. Moreover, by completely encasing the electrical connections between electrical conductors 54, 56 and 62, and the connection ends of the terminal pins 82a and 82b, the electrical connections are very durable and less resistant to detachment due to vibrations.

The free end of outer casing 88 is preferably spaced from the exterior surface of the terminal housing 84. Thus, an annular space is formed between terminal housing 84 and outer casing 88 for receiving a portion of the male connector therein. Preferably, the outer casing 88 has an annular abutment flange located at its open end for mating with the corresponding annular flange of the male connector. Preferably, the material of the outer casing 88 is constructed of a resilient material so that the annular flange of the male connector can expand the outer casing 88 radially outwardly so as to pass beneath the annular flange of the outer casing 88.

Figures 15, 16, 17:
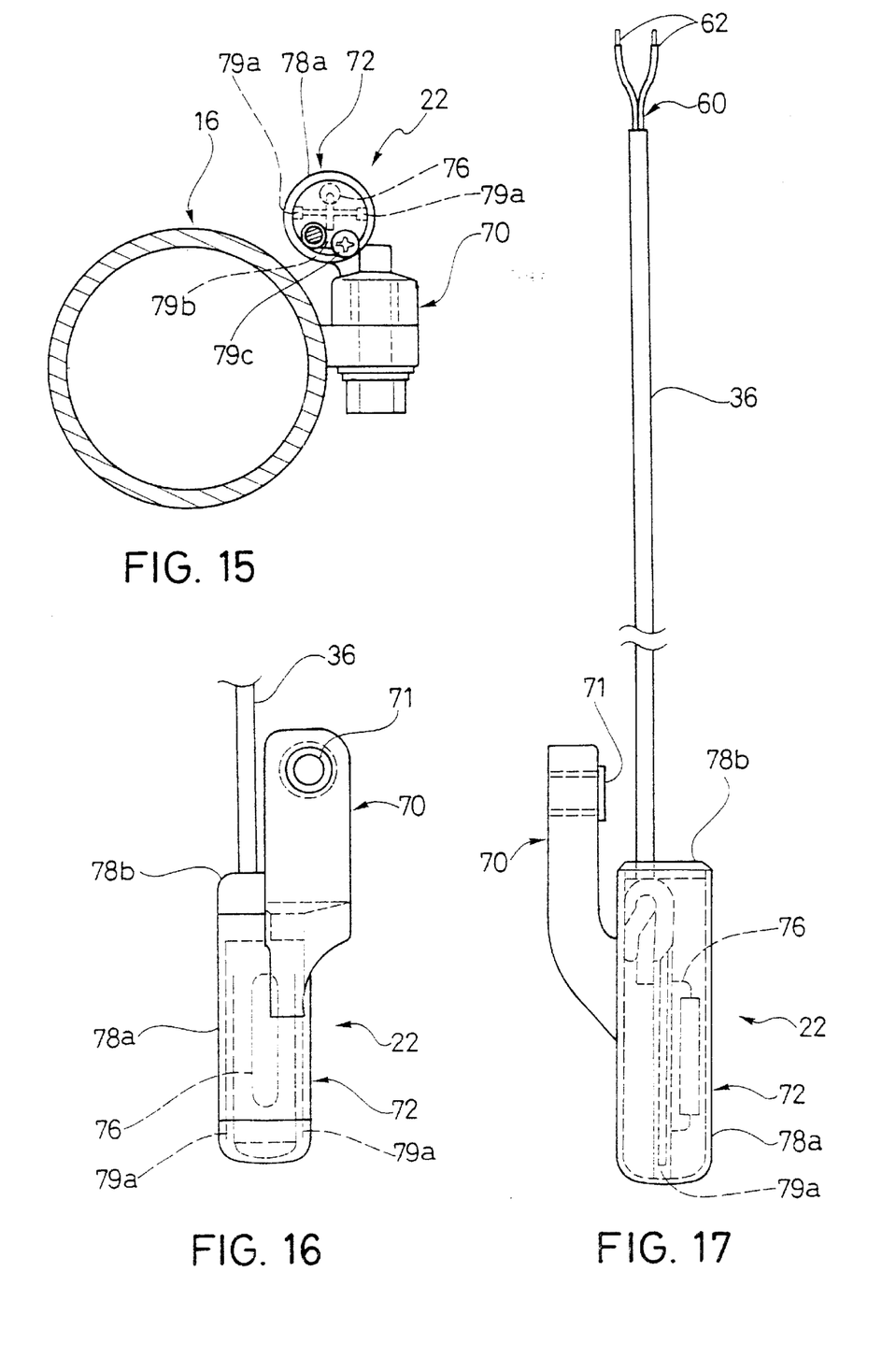
FIG. 15 is an enlarged, partial cross-sectional view of a left leg of the front suspension fork illustrated in FIGS. 1 and 2 as seen along section 15—15 of FIG. 1, to show the front wheel sensor mounted thereto.
FIG. 16 is an outside elevational view of the front wheel sensor illustrated in FIG. 9, with the front wheel sensor removed from the left leg of the front suspension fork.
FIG. 17 is a rear elevational view of the front wheel sensor illustrated in FIGS. 15 and 16.
Figure 18:
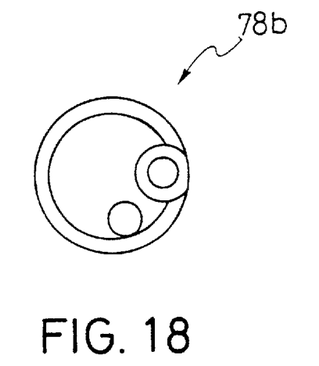
FIG. 18 is an enlarged, top plan view of the cap member of the sensor illustrated in FIGS. 1–3 and 15–17.
Figure 19:
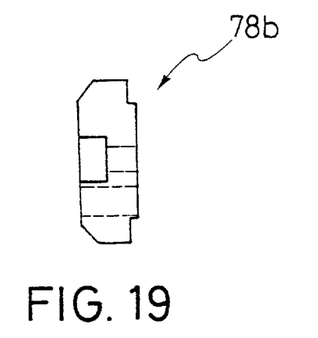
FIG. 19 is a side elevational view of the cap member illustrated in FIG. 18.
Figure 20:
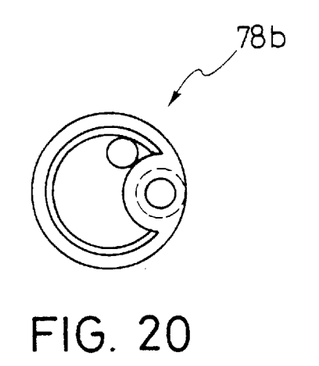
FIG. 20 is a bottom plan view of the cap member illustrated in FIGS. 18 and 19.
Figure 21:
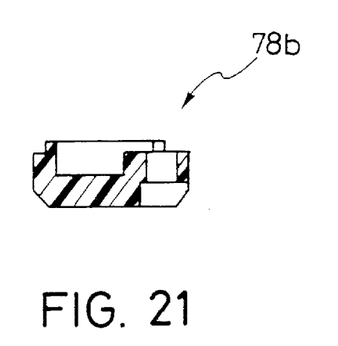
FIG. 21 is a cross-sectional view of the cap member illustrated in FIGS. 18–20 as seen along section 21—21 of FIG. 20.
Figure 22:
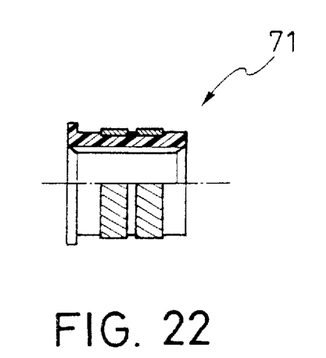
FIG. 22 is an enlarged, partial longitudinal cross-sectional view of the insert nut of the sensor illustrated in FIGS. 1–3 and 15–17.
Figure 23:
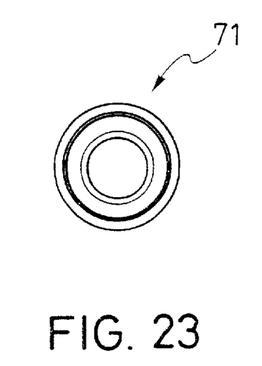
FIG. 23 is an end elevational view of the insert nut illustrated in FIG. 22.
Figure 24:
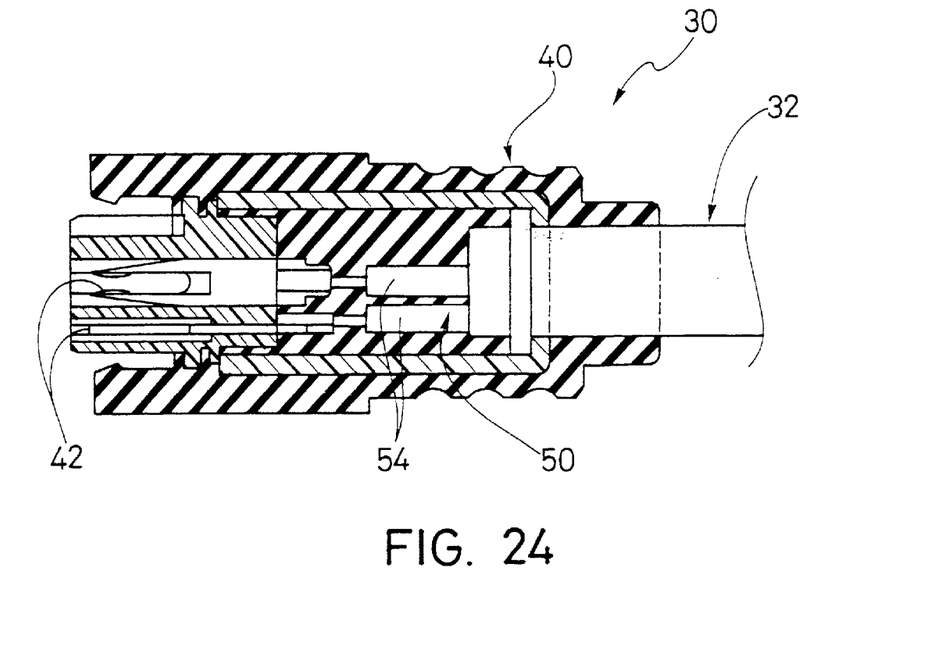
FIG. 24 is an enlarged, longitudinal cross-sectional view of the first electrical connector illustrated in FIGS. 2 and 3.

Referring to FIGS. 15–23, electrical device (sensor) 22 is preferably a front wheel speed sensing unit that includes a mounting portion (mounting bracket) 70, a sensing portion 72 and a magnet 74 (FIG. 1), as best seen in FIGS. 15–17. Sensing portion 72 is preferably a magnetically operable sensor that is mounted on the front suspension fork 16 of bicycle 10 and senses the magnet 74 that is attached to one of the spokes of the front wheel 18 of bicycle 10. In the illustrated embodiment, the sensing portion 72 includes a reed switch 76 for detecting the magnet 74. Sensor 22 generates a pulse each time wheel 18 of bicycle 10 has turned a prescribed angle or rotation. The sensor 22 outputs a bicycle speed signal to the computer 20 by detecting magnet 74 mounted on front wheel 18 of bicycle 10. In other words, the sensor 22 detects the rotational velocity of the front wheel 18 of bicycle 10. Sensor 22 is relatively conventional, except for the manner in which sensor 22 is mounted to front suspension fork 16 and coupled to secondary cable 34.

Basically, sensor (electrical device) 22 is designed to be mounted to a non-forward facing portion of front suspension fork 16. Specifically, front suspension fork 16 includes a rearward facing mounting plate with a through bore formed therein. Mounting portion 70 of sensor 22 is a flange with a through bore formed therein. An insert nut 71 (FIGS. 15–17, 22 and 23) is received in the through bore of mounting portion 70 such that a threaded fastener is used to fixedly couple mounting portion 70 to front suspension fork 16 in a relatively conventional manner. Insert nut 71 includes a pair textured sections facilitating a friction or interference fit in the through bore formed in the mounting portion 70.

Sensing portion 72 is preferably formed of a cup-shaped hollow tubular member 78a and a cap member 78b, both constructed of a non-conductive material such as a hard, rigid plastic material. Cap member 78b is mounted to an open end of tubular member 78a. Tubular member 78a includes a pair of longitudinal slots 79a adjacent the closed end and a longitudinal threaded bore 79b adjacent the open end. Reed switch 76 is mounted in slots 79a, preferably by an interference fit or snap fit (or frictionally retained). Cap member 78b is coupled to tubular member 78a via a threaded fastener 79c received in the threaded bore 79b of tubular member 78a.

As seen in FIGS. 15–21, cap member 78b includes a through bore sized to receive secondary cable 36 therethrough and a stepped bore sized to receive the threaded fastener or screw 79c. Secondary cable 36 is mechanically coupled to cap member 78b and electrically coupled to reed switch 76. Specifically, after an end of secondary cable 36 is inserted through the through bore of cap member 78b, secondary cable 36 is tied into a knot on the inner side surface of cap member 78b, as best seen in FIG. 17. Individual third conductors 62 are then trimmed (if necessary) and soldered to contacts of reed switch 76 in a conventional manner. Cap member 78b is then fixedly coupled to tubular member 78a via threaded fastener 79c to form sensing portion 72. Reed switch 76 can be mounted in slots 79a before/after individual conductors 62 are soldered to reed switch 76. This structure prevents secondary cable 36 from becoming detached from sensor 22. More specifically, this structure withstands a load of approximately 10.0 kg F applied to secondary cable 36. Thus a durable structure is achieved.

Once sensor 22 and secondary cable 22 are attached together, sensor 22 becomes a part of bicycle electrical connector cord 26. However, it will be apparent to those skilled in the art that bicycle electrical connector cord 26 could be used with other electrical devices (i.e. other than sensor 22) as needed and/or desired. For example, bicycles can be designed with numerous electrical devices and sensors such as electrically operated derailleurs, brakes, cadence sensors, chain position or tension sensors, etc. which could use the bicycle electrical connector cord 26 of the present invention as needed and/or desired.

Referring to FIGS. 2, 3, 24 and 25, as mentioned above, first electrical connector 30 is similar to second electrical connector 34. Specifically, first electrical connector 30 is identical to second electrical connector 34, except that the size and shape of first electrical connector 30 is slightly different, and the configuration of the terminal pins 42 is modified from second electrical connector 34. More specifically, first electrical connector 30 utilizes four terminal pins 42 (identical to terminal pins 82a) and does not use terminal pins 82b.

Basically, first electrical connector 30 is smaller than second electrical connector 34 because only a portion of the primary cable 32 is received therein (rather than both the primary cable 32 and the secondary cable 36 received in the second electrical connector 34). Additionally, no short terminal pins 82b are used in the first electrical connector 30. In other words, all four terminal pins 42 of first electrical connector 30 are designed to mate with receptor pins of the male connector of cycle computer 20. First electrical connector 30 is constructed in a manner identical to second electrical connector 34. In view of the similarities between the first and second electrical connectors 30 and 34, first electrical connector 30 will not be discussed or illustrated in further detail herein. Rather, it will be apparent to those skilled in the art from this disclosure that most of the descriptions of the second electrical connector 34 also apply to the first electrical connector 30.

Figure 26:
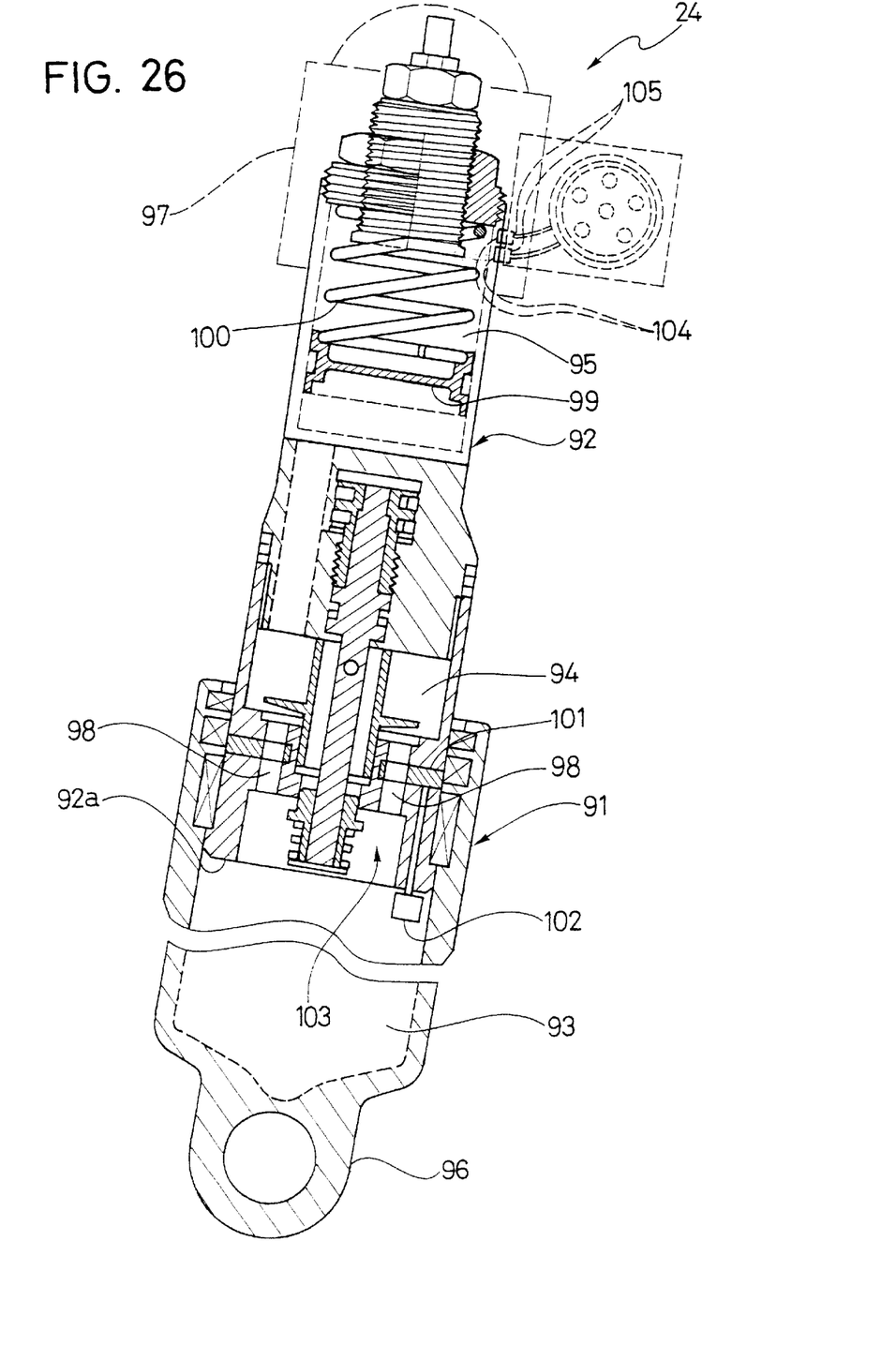
FIG. 26 is an enlarged, partial longitudinal cross-sectional view of a right leg of the front suspension fork illustrated in FIGS. 1 and 2 as seen along section 26—26 of FIG. 2, with a clamping member and male connector shown in broken lines for the purpose of illustration.

Referring to FIGS. 1, 2 and 26, front suspension fork 16 with suspension units 24 will now be discussed in more detail. The particular construction of the front suspension fork 16 is not critical to the present invention. There are currently numerous types of adjustable suspensions for bicycle 10 that can be utilized to carry out the present invention. Preferably, the front suspension fork 16 utilizes two conventional air shocks with hydraulic dampening mechanisms that have been modified to carry out the present invention.

For the sake of simplicity, only one of the suspension units 24 from of front suspension fork 16 will be discussed and illustrated herein. However, it will be apparent to those skilled in the art from this disclosure that a pair of shocks or suspension units 24 are utilized to form the front suspension fork 16.

As seen in FIG. 26, each suspension unit 24 basically includes outer and inner tubular telescoping members 91 and 92 defining inner cavities 93, 94 and 95 in the suspension unit 24. The outer tubular member 91 is coupled to the front hub of the front wheel 18 by a mounting member 96, while the inner tubular member 92 is coupled to the main frame 12 by a mounting member 97. The outer tubular member 91 has the lower hydraulic cavity that receives the bottom end 92a of the inner tubular member 92. The bottom end 92a of the inner tubular member 92 forms a piston that has a plurality of orifices 98. The orifices 98 fluidly couple the inner hydraulic cavities 93 and 94 together such that hydraulic fluid flows from the lower hydraulic cavity 93 to the upper hydraulic cavity 94 formed by a portion of the inner tubular member 92. The inner tubular member 92 also has the air cavity or chamber 95 formed above the upper hydraulic cavity 94.

The air chamber 95 and upper hydraulic cavity 94 are separated by an axially slidable piston 99. Within the air chamber 95 is a coil spring 100. The stiffness of the suspension unit 24 is controlled by changing the size of the orifices 98 utilizing a control disk 101 that is rotatably mounted to change the size of the orifices 98. In other words, the control disk 101 is moveable to change the amount of overlapping or closing of the orifices 98. Preferably, the control disk 101 of the suspension unit 24 is controlled by a electric motor 102 that rotates the control disk 101.

The electric motor 102 is electrically coupled to the cycle computer 20 that selectively operates the electrical motor 102 to adjust the stiffness of the suspension units 24. More specifically, electric motor 102 is electrically coupled to a pair of electrical contacts 104 in a conventional manner such that the electric motor 102 of each suspension unit 24 receives the same current and/or control signal (i.e. such that suspension units 24 have identical dampening characteristics). A pair of mating electrical contacts 105 of the male connector of front suspension fork 16 are electrically coupled to electrical contacts 104 and a pair of terminal pins of the male connector in a conventional manner. Thus, the orifices 98 and the control disk 101 form a front suspension control valve 103 that is automatically adjusted via the cycle computer 20. The electric motors 102 and the front cylinder control valves 103 of the suspension units 24 form a front controller or adjustment mechanism that changes or adjusts the stiffness or softness of the front suspension fork 16 based on the cycle computer 20.

Of course, it will be apparent to those skilled in the art from this disclosure that other types of adjustment mechanisms can be utilized for controlling the stiffness of the suspension units 24. Moreover, it will be apparent to those skilled in the art that various conventional circuitry (capacitors, resistors, etc.) can be used with front suspension fork 16 as needed and/or desired to carry out the present invention. Furthermore, it will be apparent to those skilled in the art that bicycle electrical connector cord 26 could be used with other electronically controlled or operated components such as brakes, derailleurs, etc. as needed and/or desired.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A bicycle electrical connector cord, comprising:

a first electrical connector having a first connector body with a plurality of first electrical contacts;

a primary cable with a first electrical conducting member electrically coupled to one of said first electrical contacts and a second electrical conducting member electrically coupled to one of said first electrical contacts;

a second electrical connector having a second connector body with at least one second electrical contact electrically coupled to said first electrical conducting member;

a secondary cable extending from said second electrical connector with a third electrical conducting member electrically coupled to said second electrical conducting member; and an electrical device electrically coupled to said third electrical conducting member.

2. A bicycle electrical connector cord according to claim 1, wherein said electrical device is a sensor that produces a signal indicative of a parameter being sensed.

3. A bicycle electrical connector cord according to claim 2, wherein said first electrical conducting member includes a plurality of individual first conductors.

4. A bicycle electrical connector cord according to claim 3, wherein
said second and third electrical conducting members include a plurality of individual second and third conductors, respectively.

5. A bicycle electrical connector cord according to claim 4, wherein
said sensor includes a reed switch.

6. A bicycle electrical connector cord according to claim 4, wherein
said individual second conductors are electrically coupled to said individual third conductors within said second connector body by at least one third electrical contact.

7. A bicycle electrical connector cord according to claim 2, wherein
said sensor includes a reed switch.

8. A bicycle electrical connector cord according to claim 2, wherein
said second and third electrical conducting members include a plurality of individual second and third conductors, respectively.

9. A bicycle electrical connector cord according to claim 2, wherein
said sensor includes a mounting bracket.

10. A bicycle electrical connector cord according to claim 2, wherein
said second electrical conducting member is electrically coupled to said third electrical conducting member within said second connector body by at least one third electrical contact.

11. A bicycle electrical connector cord according to claim 1, wherein
said first electrical conducting member includes a plurality of individual first conductors.

12. A bicycle electrical connector cord according to claim 11, wherein
said second and third electrical conducting members include a plurality of individual second and third conductors, respectively.

13. A bicycle electrical connector cord according to claim 12, wherein
said individual second conductors are electrically coupled to said individual third conductors within said second connector body by at least one third electrical contact.

14. A bicycle electrical connector cord according to claim 1, wherein
said second and third electrical conducting members include a plurality of individual second and third conductors, respectively.

15. A bicycle electrical connector cord according to claim 1, wherein
said second electrical conducting member is electrically coupled to said third electrical conducting member within said second connector body by at least one third electrical contact.

16. A method of attaching a bicycle electrical connector cord to a bicycle, comprising:
attaching a first electrical connector to a bicycle display unit on said bicycle with a first end of a primary cable extending from said first electrical connector;
attaching a second electrical connector to a first electrical device on a non-forwardly facing portion of said bicycle with a second end of said primary cable extending from said second electrical connector;
attaching a secondary cable to a non-forwardly facing portion of said bicycle with a first end of said secondary cable being coupled to said second electrical connector; and
attaching a second electrical device to a non-forwardly facing portion of said bicycle with a second end of said secondary cable being electrically coupled to said electrical device.

17. A method of attaching a bicycle electrical connector cord to a bicycle according to claim 16, wherein
said second electrical device is a sensor that produces a signal indicative of a parameter being sensed.

18. A method of attaching a bicycle electrical connector cord to a bicycle according to claim 17, wherein
said first electrical device is a front suspension fork.

19. A method of attaching a bicycle electrical connector cord to a bicycle according to claim 16, wherein
said first electrical device is a front suspension fork.

* * * * *

(12) EX PARTE REEXAMINATION CERTIFICATE (5370th)
United States Patent
Nishimoto (10) Number: US 6,600,411 C1
(45) Certificate Issued: May 9, 2006

(54) BICYCLE ELECTRICAL CONNECTOR CORD (75) Inventor: Naohiro Nishimoto, Hashimoto (JP)

(73) Assignee: Shimano Inc., Osaka (JP)

Reexamination Request:
No. 90/007,194, Sep. 8, 2004

Reexamination Certificate for:
Patent No.: 6,600,411
Issued: Jul. 29, 2003
Appl. No.: 09/801,835
Filed: Mar. 9, 2001

(51) Int. Cl.
*B62J 3/00* (2006.01)

(52) U.S. Cl. ............................... 340/432; 340/427
(58) Field of Classification Search ............... None
See application file for complete search history.

(56) References Cited

FOREIGN PATENT DOCUMENTS

JP          6-127446 A    5/1994

*Primary Examiner*—Julie Bichngoc Lieu (57) ABSTRACT

A bicycle electrical connector cord includes a first connector, a primary cable, a second connector, a secondary cable and an electrical device. The first connector has a plurality of first electrical contacts. The primary cable includes a first conducting member electrically coupled to one of the first contacts and a second conducting member electrically coupled to one of the first contacts. The second connector has at least one second electrical contact electrically coupled to the first conducting member. The secondary cable extends from the second connector and includes a third conducting member electrically coupled to the second conducting member. The electrical device is electrically coupled to the third conducting member. A method is also provided for attaching a bicycle electrical connector cord to a display unit and a pair of electrical devices on a non-forward facing portion of a bicycle.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16–19 is confirmed.

Claim 1 is cancelled.

Claims 2, 11, 14 and 15 are determined to be patentable as amended.

Claims 3–10, 12 and 13, dependent on an amended claim, are determined to be patentable.

2. A bicycle electrical connector cord [according to claim 1, wherein], *comprising:*

*a first electrical connector having a first connector body with a plurality of first electrical contacts;*

*a primary cable with a first electrical conducting member electrically coupled to one of said first electrical contacts and a second electrical conducting member electrically coupled to one of said first electrical contacts;*

*a second electrical connector having a second connector body with at least one second electrical contact electrically coupled to said first electrical conducting member;*

*a secondary cable extending from said second electrical connector with a third electrical conducting member electrically coupled to said second electrical conducting member; and*

*an electrical device electrically coupled to said third electrical conducting member,* said electrical device [is] *being* a sensor that produces a signal indicative of a parameter being sensed.

11. A bicycle electrical connector cord [according to claim 1, wherein], *comprising:*

*a first electrical connector having a first connector body with a plurality of first electrical contacts;*

*a primary cable with a first electrical conducting member electrically coupled to one of said first electrical contacts and a second electrical conducting member electrically coupled to one of said first electrical contacts;*

*a second electrical connector having a second connector body with at least one second electrical contact electrically coupled to said first electrical conducting member;*

*a secondary cable extending from said second electrical connector with a third electrical conducting member electrically coupled to said second electrical conducting member; and*

*an electrical device electrically coupled to said third electrical conducting member,* said first electrical conducting member [includes] *including* a plurality of individual first conductors.

14. A bicycle electrical connector cord [according to claim 1, wherein], *comprising:*

*a first electrical connector having a first connector body with a plurality of first electrical contacts;*

*a primary cable with a first electrical conducting member electrically coupled to one of said first electrical contacts and a second electrical conducting member electrically coupled to one of said first electrical contacts;*

*a second electrical connector having a second connector body with at least one second electrical contact electrically coupled to said first electrical conducting member;*

*a secondary cable extending from said second electrical connector with a third electrical conducting member electrically coupled to said second electrical conducting member; and*

*an electrical device electrically coupled to said third electrical conducting member,* said second and third electrical conducting members [include] *including* a plurality of individual second and third connectors, respectively.

15. A bicycle electrical connector cord [according to claim 1, wherein], *comprising:*

*a first electrical connector having a first connector body with a plurality of first electrical contacts;*

*a primary cable with a first electrical conducting member electrically coupled to one of said first electrical contacts and a second electrical conducting member electrically coupled to one of said first electrical contacts;*

*a second electrical connector having a second connector body with at least one second electrical contact electrically coupled to said first electrical conducting member;*

*a secondary cable extending from said second electrical connector with a third electrical conducting member electrically coupled to said second electrical conducting member; and*

*an electrical device electrically coupled to said third electrical conducting member,* said second electrical conducting member [is] *being* electrically coupled to said third electrical conducting member within said second connector body by at least one third electrical contact.

* * * * *